Sept. 12, 1961  C. J. SILAS ET AL  2,999,274
DISPERSING SOLID ADDITIVES IN PLASTICS
Filed April 14, 1958  2 Sheets-Sheet 1

DISPERSION RATING
REAR PLATE-HOLES 0.020 INCH IN DIAMETER (INJECTION RATE OF 10.8 CUBIC INCHES PER SECOND)

PRESSURE INCREASE REQUIRED TO FILL CAVITY (%)
REAR PLATE-HOLES 0.020 INCH IN DIAMETER (INJECTION RATE OF 10.8 CUBIC INCHES PER SECOND)

INVENTORS
C.J. SILAS
J.N. SCOTT, JR.
BY *Hudson & Young*
ATTORNEYS

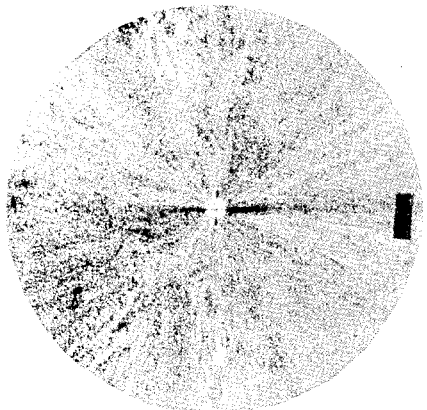
FIG 7
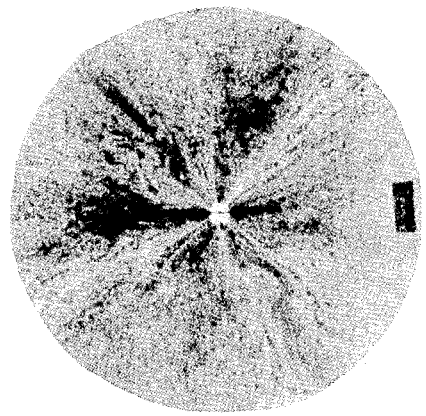
FIG 8
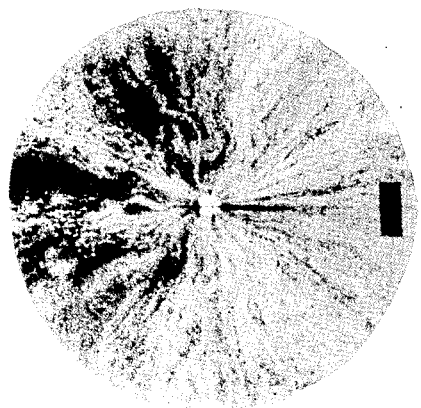
FIG 9
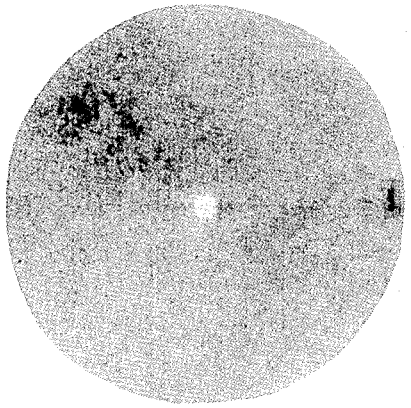
FIG 10
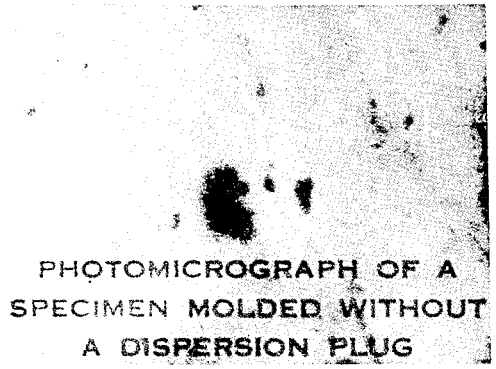
PHOTOMICROGRAPH OF A SPECIMEN MOLDED WITHOUT A DISPERSION PLUG
FIG. 11
PHOTOMICROGRAPH OF A SPECIMEN MOLDED FROM SMALL PELLETS WITH A DISPERSION PLUG
FIG 12

United States Patent Office 2,999,274
Patented Sept. 12, 1961

2,999,274
DISPERSING SOLID ADDITIVES IN PLASTICS
Cecil J. Silas and John N. Scott, Jr., Bartlesville, Okla., assignors to Phillips Petroleum Company, a corporation of Delaware
Filed Apr. 14, 1958, Ser. No. 728,214
5 Claims. (Cl. 18—30)

This invention relates to improved apparatus to aid in dispersing dry solid additives in thermoplastic material. In another aspect it relates to a dispersion plug for insertion in the nozzle of an injection molding machine to improve the dispersion of pigments in a resinous thermoplastic polymer as it is being molded. In still another aspect this invention relates to a method for obtaining a high degree of dispersion of colorant in thermoplastic polymer by dry mixing.

The coloring of thermoplastic resins such as polyethylene for injection molding has for some time been accomplished by blending the natural resin with powdered pigment in various types of mills or extruders or by dry mixing the colorant with the natural resin and then injection molding. The latter method is desirable from a standpoint of economics and colored resin inventory, but sometimes results in unsatisfactory color dispersion. In operations where small gates or small nozzle openings are used a satisfactory dispersion can at times be obtained. The dispersion problem is generally present, however, when molding rigid polyethylenes in large or thick sections where "pin point" gates are impracticable.

We have found that satisfactory dispersions of pigment can be obtained in thermoplastic resins on injection molding with dry coloring methods by using a dispersion or mixing plug of a particular design in the nozzle of the injection molding machine. Broadly, our invention resides in the dispersion of powdered solid additives, which have been dry mixed with the thermoplastic resin, by forcing the mixture with the resin in a fluid state through a plurality of apertures which have a diameter not greater than 0.025 inch and thence through a plurality of larger apertures having a diameter not greater than 0.06 inch and a land length of at least about 0.1 inch. We have found that dry pigments which tend to agglomerate are satisfactorily reduced in size and dispersed throughout the plastic by forcing the mixture through a series of openings of this particular size and preferably by providing a proper number of the first mentioned smaller openings in relation to the polymer extrusion rate that the polymer velocity through the smaller openings is not less than about 0.34 cubic inch per second per opening.

The mixing plug of our invention comprises two perforated plates arranged in series with the upstream plate containing a plurality of fine holes for reducing the additive particle size, and the downstream plate containing a plurality of holes larger than those of the upstream plate but having a longer minimum land length. In order to minimize pressure drop the fine holes should have a conical approach recessed in the plate. Preferably, our plug is a unitary member with the plates connected at their centers and spaced apart by a rod. For satisfactory dispersion of dry pigments in rigid polyethylene the holes in the upstream plate should be not greater than 0.025 inch in diameter and preferably not greater than 0.020, and the holes in the downstream plate not greater than 0.06 inch in diameter with a minimum land length of 0.1 inch. The plug of our invention is most effective when employing polymers having a melt index less than about 1.5.

It is an object of our invention to provide means for obtaining satisfactory dispersion of dry colorants in thermoplastic resin on injection molding.

It is another object of our invention to provide an improved dispersion plug for use in a nozzle of an injection molding machine.

Still another object is to provide a method of obtaining dispersions of pigment in resinous thermoplastic materials which have been premixed by dry blending.

Another object is to provide the method and apparatus for dispersing pigment in normally solid thermoplastic polymer on injection molding without the necessity of pregranulating the polymer.

Still another object is to provide a method and apparatus for obtaining satisfactory color dispersion in rigid polyethylene on injection molding without greatly increasing the pressure required to completely fill the mold.

Other objects, advantages and features of our invention will be apparent to those skilled in the art from the following description and drawing in which:

FIGURES 7–10 are photographs of color discs made by injection molding with no mixing plug, mixing plugs of the prior art and the mixing plug of our invention; and FIGURES 11 and 12 are photomicrographs of color discs showing the difference in dispersions obtained with and without the mixing plug of our invention.

Figure 3:
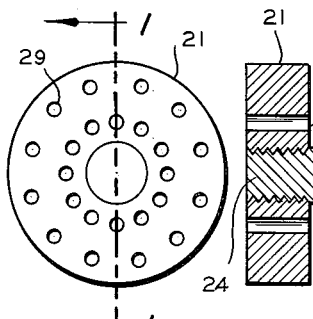
FIGURES 1–3 are various views of the dispersion plug of our invention.

While the method and apparatus of our invention has been developed primarily for dispersing solid pigments in resinous polymers such as polyethylene, our invention can also be employed to aid in the dispersion of other additives of similar nature such as antioxidants and the like. Because poor dispersions of pigment are quite evident visually in injection molded structures such as plates, tumblers, and the like, the requirements for this particular application are most stringent. In order to employ the advantages of dry coloring, it is necessary that adequate dispersion is provided for in the molding process.

Many types of colorants can be employed in a dry coloring operation and subsequently dispersed in the polymer by our invention. Oil-soluble dyes and pigments, both organic and inorganic, such as cadmium colorants, iron blues, lead and titanium oxides and carbon black pigments of this type are available commercially in powdered form suitable for mixing directly with the natural resin. Resinous polymers commonly used include polystyrene or olefin polymers of various types including polyethylene, polypropylene and copolymers of ethylene with other monoolefins. Polyolefins of this type are generally obtained commercially in pelletized form, and an advantage of our invention is that the dry pigment can be mixed directly with the pelletized polymer by dry blending operations, such as tumbling or mixing in a double cone blender, and the dry mixture fed directly to an injection molding machine without the necessity of a preliminary grinding or mastication step.

The residents for which our invention is particularly valuable are the high density polymers of ethylene, particularly polyethylene and copolymers of ethylene with relatively low amounts (up to 10 or 15 weight percent in the monomer system) of the comonomers propylene, 1-butene and/or 2-butene. These ethylene polymers have a density of at least about 0.94 gram per cubic centimeter at 25° C. and the homopolymer has a density of at least about 0.955. Before density determinations are made, samples of these polymers are compression molded at 300° F. and allowed to cool in the mold to 250° F. over a period of 10 minutes after which water is circulated through the mold coils and the specimen is cooled to room temperature (about 78° F.) in about 8 minutes. The softening temperature of these polymers, determined as subsequently described, is generally at least about 240° F., while that of the homopolymer is about 260° F. The melt index can vary over a relatively broad range depending upon the conditions of preparation, but our invention is particularly valuable in coloring ethylene polymer having a melt index not greater than 1.5.

Melt index for these polymers can be determined by the ASTM method D–1238–52T using five 2-minute extrudate samples. Softening temperature can be determined from softness measurements obtained by a method of Karrer, Davis and Dieterich, Industrial and Engineering Chemistry (Analytical Edition) 2, 96 (1930). The softness for the polymer is determined as described in this article over a range of temperatures and plotted with temperature on the abscissa to form a curve showing softness increasing with temperature. The softening temperature is, by definition, the point at which the slope of the curve equals 0.0035 softening units per degree F.

Solid polymers can be prepared from mono-1-olefins having from 2 to 8 carbon atoms per molecule and no chain branching nearer the double bond than the 4-position by the method disclosed in U.S. Patent 2,825,721, issued March 4, 1958, to J. P. Hogan et al. This process involves contacting the monomer system with a catalyst comprising as the sole essential ingredient chromium oxide associated with at least one porous oxide selected from the group consisting of silica, alumina, zirconia and thoria. The catalyst generally contains between 0.1 and 10 or more weight per cent chromium as chromium oxide and a substantial portion of the chromium is in the hexavalent state. Polymerization can be carried out in the gas phase but preferably an inert diluent is employed and the pressure of the reaction is sufficient to maintain the diluent in the liquid phase. The temperature of the reaction is generally in the range of about 100 to 500° F. Solvents which are especially useful in the polymerization process are paraffins and cycloparaffins having from 3 to 12, preferably 5 to 12, carbon atoms per molecule. The solvent should be relatively inert, nondeleterious, and liquid under the operating conditions. Suitable diluents include propane, isobutane, normal pentane, isopentane, isooctane, cyclohexane, methylcyclohexane, and the like.

While the above method employing the chromium oxide-containing catalyst is preferred to produce the polymer for our invention, other methods of polymerizing ethylene or other 1-olefins to solid, resinous materials can be employed. For example, solid ethylene polymers can be prepared with other low pressure processes which employ catalyst systems containing a group IV metal halide and an organometal or an organometallic halide.

In practicing the method of our invention the mixture of pigment and polymer which has been melted to a fluid state is forced through a plurality of apertures which are not greater than 0.025 inch in diameter, preferably having a diameter in the range of 0.010 to 0.025 inch. We have found that employing an aperture of this particular size reduces pigment particle size and pigment agglomerates sufficiently to enable thorough dispersion throughout the polymer to such an extent that individual pigment particles are no longer visible, even in a photomicrograph of the molded specimen. In addition to the aperture size, a proper number of apertures are provided to permit a polymer velocity between 0.34 and 1.1 cubic inches of polymer per second per aperture. A polymer velocity per aperture in this range provides a high dispersion rating with a minimum increase in pressure requirement for polymers having a melt index below about 1.

We have further found that satisfactory dispersions are not provided by passage of the mixture through a single set of apertures alone, but that a second step is necessary in which the mixture which has been passed through the small apertures above-described is forced through a plurality of apertures somewhat larger (about 0.02 to 0.06 inch in diameter) than the apertures of the first step and having a land length of at least 0.1 inch, and generally not over 0.5 inch. Preferably, the size of the apertures for the second step is about 0.03 to 0.05 inch in diameter, while the number of apertures in the second step can be adjusted to reduce the pressure requirements. Generally the velocity of the polymer through these apertures is not greater than about 1.0 cubic inch of polymer per second per aperture and not less than 0.2 cubic inch per second. The particles of pigment which have been reduced in size and mixed with polymer in the first step are distributed throughout the remaining polymer by the above-described second step. In this way streaks in the molded article are eliminated. When using only the first step of the above-described process, the pigment agglomerates are disintegrated, but the molded specimens are quite streaked. When only the second step of the method is employed, the specimen is relatively uniform in appearance except for visible specks of pigment agglomerate. The combination of steps in the sequence stated provides highly satisfactory color dispersions.

The dispersion plug of our invention which can be inserted in the nozzle of conventional injection molding equipment in order to practice the above-described method can best be described by reference to the drawing.

Figure 1:
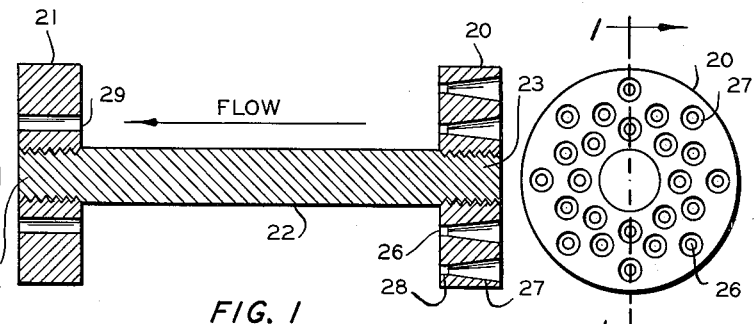

FIGURE 1 is a longitudinal cross section of our dispersion plug showing a rear plate 20 and a front plate 21 connected at their centers and spaced apart by a connecting rod 22 having threaded ends 23 and 24 onto which the two perforated plates or discs are mounted. In this description the "rear plate" refers to the perforated dis- positioned upstream in the nozzle of the injection molding machine and farthest from the mold, while the "front plate" is the perforated disc closest to the mold and downstream from the rear plate as indicated by the arrow showing direction of flow in FIGURE 1.

Rear plate 20 is provided with a plurality of apertures 26, each aperture having a conical approach 27 which is recessed or countersunk into the plate 20. The conical approaches are provided to reduce the pressure drop through plate 20 by reducing the length of the land 28 of holes 26 to a length/diameter ratio of not over 10:1 and preferably not over 3:1. The minimum land length/hole diameter ratio depends upon the strength of the plate and pressures used, but preferably is not less than 0.5:1. The number of holes 26 in rear plate 20 is a function of the injection rate which in turn depends generally upon the size of the injection molding machine employed.

Figure 5:
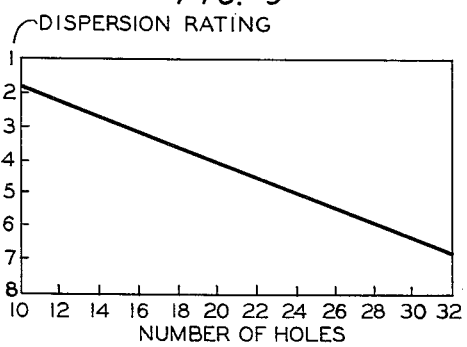
FIGURES 5 and 6 are graphs showing the relationship between dispersion rating, pressure requirement, and plug design.
Figure 6:
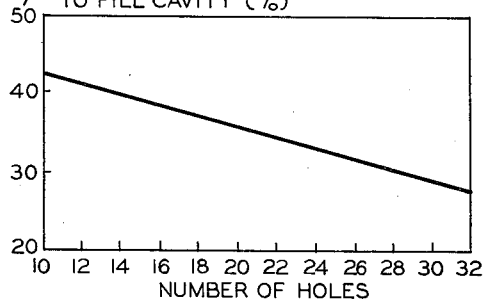

FIGURES 5 and 6 show the relationship between the dispersion obtained in a molded sample and the number of holes in the rear plate at an injection rate of 10.8 cubic inches of polymer per second (FIGURE 5) and the relationship between this number of holes and the increased pressure required to fill the mold cavity over that pressure needed when no dispersion plug is employed (FIGURE 6). Dispersion ratings are based on a scale of from 1 to 25 with a rating of 1 referring to the dispersion obtained from material which was carefully premilled on a roll mill before injection molding in order to obtain as complete a dispersion of the pigment in polyethylene as possible. A 25 rating refers to the dispersion obtained with pigment dry blended with polyethylene pellets and injection molded under conditions described in Example 1 without a mixing plug in the nozzle of the injection molding machine. Dispersion ratings of 1–8 are considered satisfactory depending upon the particular application of the molded article. The dispersion plug used to obtain the data on which FIGURES 5 and 6 are based was the plate plug described in Example 1. In this plug the rear plate had holes 0.02 inch in diameter with a conical approach which provided a land length to diameter ratio of about 1:1. Satisfactory dispersions are obtained at an injection rate of 10.8 cubic inches per second with from 10 to 32 holes in the rear plate. A rating of 8–9 was the poorest dispersion obtained with the plug of our invention regardless of the number of holes in the rear plate. The polymer velocity per hole represented by FIGURES 5 and 6 ranges from 1.1 cubic inches for 10 holes in the plate to 0.34 cubic inch for 32 holes in the plate. For increased or decreased injection rates, this polymer velocity per hole can be used to determine the proper number of holes in the rear plate for a desired dispersion rating and pressure requirement. For example, if a dispersion rating of 4 is desired for a particular molded article, the rear plate of the dispersion plug should contain from 20 to 22 holes for an injection rate of 10.8 cubic inches per second, or a sufficient number of holes to provide a polymer velocity per hole of about 0.49 cubic inch per second. The increase in pressure required to fill the mold cavity, as seen from the graph of FIGURE 6, is about 37 percent greater than would be required to fill the cavity if no mixing plug were employed.

Referring again to FIGURE 1, the front plate 21 is provided with a plurality of apertures 29 which should be larger than the holes in the rear plate and have a diameter of about 0.02 to 0.06 inch, preferably 0.03 to 0.05 inch. Holes 29 should be sufficient in number that the pressure drop through the front plate is not large in relation to the pressure drop through the rear plate. In other words, most of the pressure drop through the mixing plug is provided by rear plate 20. In general, the number of holes 29 should be sufficient that the polymer velocity per hole does not exceed 1.0 cubic inch per second. The maximum number will depend upon design and convenience so as not to weaken seriously the strength of plate 21, and, in general, the velocity per hole should not be less than 0.2 cubic inch per second. The number and size of the holes of the front plate is less critical than for the rear plate, but the land length of the holes in the front plate should be at least 0.1 inch. Preferably, the land length of holes 29 should be about 0.2 to 0.5 inch. These holes can be sufficiently large and plate 21 of such thickness that the conical approach is not necessary.

Figure 2:
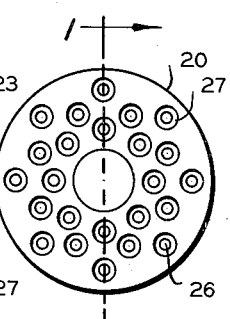

FIGURE 2 is an end view of plate 20, while FIGURE 3 is an end view of plate 21. The length of rod 22 depends primarily upon the size of the nozzle of the injection molding machine in which the plug is to be employed. Rod 22 should be at least about 0.25 inch long and is preferably not more 8 inches long.

Figure 4:
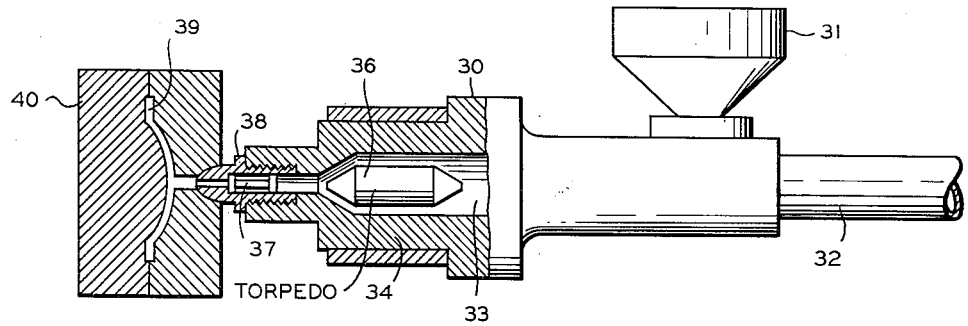
FIGURE 4 is a drawing, in section, showing the position of our dispersion plug in an injection molding machine.

FIGURE 4 shows, in cross section, the position of the dispersion plug in an injection molding machine. The machine 30 is equipped with a hopper 31 into which a dry mixture of pigment and polymer pellets is fed. Ram 32 forces the mixture into chamber 33 of heating cylinder 34 where the polymer is heated to a fluid state. Torpedo 36 aids in mixing the pigment and polymer. Dispersion plug 37 is positioned in the nozzle 38 of the molding machine, oriented as shown in FIGURE 1 in relation to the direction of flow of the polymer. The dispersion plug 37 is held in nozzle 38 by shoulders in the nozzle which abut against either the rear plate or the front plate or both. The pigmented polymer is forced into mold cavity 39 of mold 40 after passing through the apertures of the dispersion plug of our invention.

We have found that in practicing our invention relatively large pellets, i.e., 0.19 x 0.19 inch, can be used satisfactorily with dry coloring methods. The currently marketed pellets of 0.12 x 0.12 inch are considerably easier to color and there is not much advantage to be gained by using smaller pellets than 0.12 x 0.12 inch since a dispersion plug is necessary regardless of the pallet size. The melt index or melt viscosity of the resin determines the shear stresses that are encountered as the resin is forced through the holes in the dispersion plug. Ethylene polymers with melt indexes higher than about 1 can be readily colored with the dispersion plug of our invention and, in general, require a smaller number of holes in the rear plate to obtain a color dispersion equal to that obtained with a polymer having a melt index of less than 1.

Wetting agent which is sometimes used to coat the pellets before powdered pigment is added should be held to a minimum, generally less than 0.02 percent, and avoided altogether if possible. An excess of wetting agent can cause pigment agglomeration resulting in nonuniform deposit on the pellets. These agents are unnecessary for the usual small pigment loadings when mixing with twin shell blending equipment and using the dispersion plug of our invention.

Advantages of this invention are illustrated by the following examples. The blend components, and their proportions, and other specific conditions are presented as being typical and should not be construed to limit the invention unduly.

In the following examples, polyethylene pellets approximately ⅛ inch round and ⅛ inch long were dry blended in a double-cone blender with from 1 to 2 percent of a red pigment supplied by the Ferro Corporation for about 15 to 20 minutes. This pigment was an inorganic hard particle type known to be difficult to disperse. The polyethylene, prepared by the previously described chromium oxide catalized polymerization, had a density of 25° C. of about 0.96 gram per cubic centimeter and melt index of 0.9 as measured by ASTM method D–1238–52T modified as above described. The blend of polyethylene and pigment was then introduced into a conventional 8 ounce injection molding machine with the molten polymer being injected at a rate of 10.8 cubic inches per second into a disk-forming cavity of a volume such that a 0.035 inch thick disk was formed. The disk was sprue-gated in the center. Also, in all instances, a 0.125 inch nozzle opening was used.

Rating of the type of dispersers obtained with each dispersion plug was accomplished by holding the disk formed up to a strong light and visually observing the dispersion of the red pigment in the natural polyethylene. A control disk was prepared by carefully milling pigment and polyethylene on a roll mill to obtain as complete a dispersion as possible and thereafter injection-molding the milled material into the disk cavity. In a numerical rating of from 1 to 25 for the degree of dispersion, the disk formed from the milled material was given the highest (1) rating.

*Example I.*—Several colored disks were molded using the above described procedure with various types of dispersion plugs, comparing the dispersion plug of this invention with those of the prior art. The following molding cycle was used: 5 second injection time—3 second booster—3 second mold open—15 second clamp time.

Table I

| Type Dispersion Plug | Cylinder Temp. (° F.) | Nozzle Temp. (° F.) | Mold Temp. (° F.) | Ram Pressure (pounds/ square inch gage) | Dispersion Rating | Figure | Remarks |
|---|---|---|---|---|---|---|---|
| None | 525 | 525 | 150 | 900 | 25 | 7 | Color dispersion was not uniform. |
| Polyliner(R) | 525 | 525 | 150 | 900 | 24 | 8 | No improvement over control—mold cavity was not completely filled. |
| Ball Bearing | 525 | 525 | 150 | 980 | 24 |  | Mold cavity was not completely filled. Poor dispersion. |
| Pineapple | 525 | 525 | 150 | 880 | 24 | 9 | Mold cavity was not completely filled. Poor dispersion. |
| Plate Plug | 525 | 525 | 150 | 900 | 2–3 | 10 | Mold cavity completely filled. Dispersion very good. |

The plate plug of this invention was stainless steel and had two perforated disks, ¼ inch thick and 0.75 inch in diameter, connected by a 5/16 inch rod 3⅝ inches long. There were 22 holes, 0.020 inch in diameter in the rear plate and 32 holes, 0.041 inch in diameter, in the front plate. The holes in the rear plate had a conical approach with a land length to diameter ratio of about 1 to 1. The front plate had straight drilled holes with a ¼ inch land length.

The other plugs used were the Polyliner (a trademark), pineapple and ball bearing plugs, all well known mixing plugs in the art. The ball bearing plug forces the polymer to pass around a series of tightly packed ball bearings. The Polyliner plug is shown in the Injection Molders Supply Nozzle Catalog (1957) page 29, and the pineapple plug is shown in the same catalog on page 28 and also in U.S. Patent 2,669,750. Each plug is designed to subject the polymer and pigment to a shearing or smearing action.

The results of these runs are shown in Table I. Reference is made to FIGURES 7–10 which are photographs of the polymer dispersion disks formed in each run.

FIGURES 11 and 12 are photomicrographs magnified 100 times of thin sections of colored polymer disks formed with no dispersion plug and with the plug of this invention, respectively. It can be seen that without a dispersion plug, large pigment agglomerates appear in the sample. The pigment dispersion with the plug of this invention (FIGURE 12) contains no large agglomerates. The above data show marked improvement in pigment dispersion for the plug of our invention over those of the prior art.

*Example II.*—Various numbers and sizes of holes in the dispersion plug of our invention were tried in order to determine the most effective and economical arrangement. The front plate contained 32 holes 0.041 inch in diameter with a land length of 0.25 inch. The number and size of holes in the rear plate were varied as shown in Table II. Molding conditions were as described in Example I.

Table II

| Run No. | Number of Holes in Rear Plate | Size of Holes in Rear Plate, inch | Remarks |
|---|---|---|---|
| 1 | 4 | 0.030 | Poor dispersion. Mold did not fill. |
| 2 | 8 | 0.025 | Unsatisfactory dispersion. Pressure drop too great and mold did not fill. |
| 3 | 12 | 0.020 | Good dispersion. Pressure drop too great to completely fill mold. |
| 4 | 22 | 0.020 | Good dispersion. Mold completely filled. |

As shown above the rear plate hole size should be less than 0.025 inch in diameter when molding polymer having a melt index of 0.9. Our investigations have shown that the rear plate hole diameter is a critical dimension but that its optimum value is dependent, within narrow limits, upon the melt index of the polymer. For instance, with polymers having a lower melt index than that employed in the above examples a hole diameter up to 0.025 inch can be used, while the hole diameter should not exceed 0.020 inch when the melt index of the polymer is greater than 1.5. A hole diameter of about 0.013 inch is best for obtaining dispersions of colorant in polymer having a melt index of 5. We prefer a hole diameter of 0.020 inch for most applications. The number of holes can be varied to arrive at an acceptable pressure drop for a particular operation. FIGURES 5 and 6, as previously discussed, provide a convenient basis for this selection.

As will be evident to those skilled in the art, various modifications of this invention can be made, or followed, in the light of this foregoing disclosure and discussion, without departing from the spirit or scope thereof.

We claim:

1. An improved dispersion plug suitable for use in the nozzle of an injection molding machine to disperse pigment in a resinous thermoplastic polymer comprising a first perforated disk to be positioned upstream in said nozzle, said first disk containing a plurality of holes having a diameter of from 0.010 to 0.025 inch, each of said holes having an enlarged opening countersunk in one face of said first disk, a second perforated disk to be positioned downstream of said first disk in said nozzle, said second disk containing a plurality of holes having a diameter greater than the diameter of the holes in said first disk and in the range of 0.020 to 0.060 inch with a land length of from 0.1 to 0.5 inch, and a rod axially joining said first and second disks and spacing said disks apart.

2. An improved dispersion plug according to claim 1 wherein said holes in said first disk have a land length to diameter ratio of about 0.5:1 to 3:1.

3. An improved dispersion plug suitable for use in the nozzle of an injection molding machine to disperse pigment in a resinous thermoplastic polymer comprising a rear perforated disk, a front perforated disk, and a rod axially connecting the centers of said disks and spacing said disks apart, said disks being dimensioned to fill the cross section of said nozzle, said rear disk having a sufficient number of holes about 0.010 to 0.025 inch in diameter to permit a polymer velocity per hole of about 0.34 to 1.1 cubic inches per second, said holes having an enlarged opening countersunk in one face of said rear disk, and said front disk containing holes with a land length of from 0.1 to 0.5 inch and having a diameter of from 0.020 to 0.060 inch but larger than the holes in said rear disk and in sufficient number to permit a polymer velocity per hole not greater than about 1.0 cubic inch per second, said plug to be used with said rear disk upstream from said front disk.

4. An improved dispersion plug according to claim 3 wherein the land length to diameter ratio of the holes in said rear disk is about 1 to 1, and said rod is about 0.25 to 8 inches long.

5. An improved dispersion plug suitable for use in the nozzle of an injection molding machine to disperse pigment in a resinous thermoplastic polymer comprising a rear plate about 0.75 inch in diameter and about 0.25 inch thick having about 22 holes about 0.020 inch in diameter, each of said holes having an enlarged conical opening recessed in the upstream face of said rear plate to provide a land length to diameter ratio for said holes of about 1:1, a front plate about 0.75 inch in diameter and about 0.25 inch thick having about 32 holes about 0.04 inch in diameter with a land length of 0.25 inch, and a rod axially connecting the centers of said front and rear plates spacing said plates about 3 to 4 inches apart, said rear plate to be used in position upstream from said front plate.

References Cited in the file of this patent
UNITED STATES PATENTS

| | | |
|---|---|---|
| 1,375,623 | Bartels | Apr. 19, 1921 |
| 2,332,829 | Parsons et al. | Oct. 26, 1943 |
| 2,543,679 | Van Riper | Feb. 27, 1951 |
| 2,792,122 | Munch et al. | May 14, 1957 |
| 2,880,460 | Monett | Apr. 7, 1959 |